US011953749B2

(12) United States Patent
Kondapalli et al.

(10) Patent No.: US 11,953,749 B2
(45) Date of Patent: Apr. 9, 2024

(54) INTERMITTENTLY BONDED RIBBON WITH COLORED BONDS

(71) Applicant: Sterlite Technologies Limited, Gurgaon (IN)

(72) Inventors: Hemanth Kondapalli, Gurgaon (IN); Atulkumar Mishra, Gurgaon (IN); Akhil Garg, Gurgaon (IN)

(73) Assignee: Sterlite Technologies Limited, Gurgaon (IN)

( * ) Notice: Subject to any disclaimer, the term of this patent is extended or adjusted under 35 U.S.C. 154(b) by 224 days.

(21) Appl. No.: 17/139,706

(22) Filed: Dec. 31, 2020

(65) Prior Publication Data
US 2021/0286143 A1    Sep. 16, 2021

(30) Foreign Application Priority Data
Mar. 16, 2020    (IN) .............................. 202011011304

(51) Int. Cl.
*G02B 6/44*    (2006.01)
(52) U.S. Cl.
CPC .................................... *G02B 6/447* (2013.01)

(58) Field of Classification Search
CPC ....................................................... G02B 6/447
USPC ........................................................... 385/114
See application file for complete search history.

(56) References Cited

U.S. PATENT DOCUMENTS

2021/0302677 A1*  9/2021  Boxer .................. G02B 6/4403

FOREIGN PATENT DOCUMENTS

WO    WO-2021133534 A1 *  7/2021  ............... G02B 6/44

* cited by examiner

*Primary Examiner* — Jerry M Blevins
(74) *Attorney, Agent, or Firm* — Steven R. Fairchild; Michael J. Pennington

(57) ABSTRACT

The present disclosure provides an intermittently bonded optical fibre ribbon. The intermittently bonded optical fibre ribbon includes a plurality of optical fibres such that adjacent optical fibre of the plurality of optical fibres is bonded intermittently along the length by a plurality of bonds. The plurality of bonds is defined by a plurality of colours. The plurality of bonds may form a predefined pattern. The predefined pattern may be used for identification of the intermittently bonded optical fibre ribbon.

18 Claims, 5 Drawing Sheets

300

| | Bond 1 | Bond 2 | Bond 3 | Bond 4 | Bond 5 | Bond 6 | Bond 7 | Bond 8 | Bond 9 | Bond 10 | Bond 11 | Colours |
|---|---|---|---|---|---|---|---|---|---|---|---|---|
| Ribb 1 | | | | | | | | | | | | Blue-Olive |
| Ribb 2 | | | | | | | | | | | | Orange-Olive |
| Ribb 3 | | | | | | | | | | | | Green-Olive |
| Ribb 4 | | | | | | | | | | | | Brown-Olive |
| Ribb 5 | | | | | | | | | | | | Slate-Olive |
| Ribb 6 | | | | | | | | | | | | White-Olive |
| Ribb 7 | | | | | | | | | | | | Red-Olive |
| Ribb 8 | | | | | | | | | | | | Black-Olive |
| Ribb 9 | | | | | | | | | | | | Yellow-Olive |
| Ribb 10 | | | | | | | | | | | | Violet-Olive |
| Ribb 11 | | | | | | | | | | | | Pink-Olive |
| Ribb 12 | | | | | | | | | | | | Aqua-Olive |
| Ribb 13 | | | | | | | | | | | | Blue |
| Ribb 14 | | | | | | | | | | | | Orange |
| Ribb 15 | | | | | | | | | | | | Green |
| Ribb 16 | | | | | | | | | | | | Brown |
| Ribb 17 | | | | | | | | | | | | Slate |
| Ribb 18 | | | | | | | | | | | | White |
| Ribb 19 | | | | | | | | | | | | Red |
| Ribb 20 | | | | | | | | | | | | Black |
| Ribb 21 | | | | | | | | | | | | Yellow |
| Ribb 22 | | | | | | | | | | | | Violet |
| Ribb 23 | | | | | | | | | | | | Pink |
| Ribb 24 | | | | | | | | | | | | Aqua |

FIG. 3

INTERMITTENTLY BONDED RIBBON WITH COLORED BONDS

CROSS-REFERENCE TO RELATED APPLICATIONS

The present application is based on, and claims priority from an Indian Application Number 202011011304 filed on 16 Mar. 2020, the disclosure of which is hereby incorporated by reference herein.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of an optical fibre and, in particular, relates to intermittently bonded ribbon.

Description of the Related Art

With the evolution of 5G and increase of data consumption in the recent years, application of data Centre's and Telecoms have increased drastically. In addition, large scale data centers and Telecom sectors require ultra-high fibre density cables which offers high data rate with low latency. The high fibre density cables include a large number of optical fibres inside cable. The optical fibres may be in the form of optical fibre ribbons or loose fibres. However, larger number of optical fibres leads to increase in diameter of the high fibre density cables. The high fibre density cable includes intermittently bonded ribbons in order to reduce the diameter. The intermittently bonded ribbons are rollable and hence reduce the diameter of the high fibre density cable. However, when several intermittently bonded ribbons are present inside the high fibre density cable, it becomes difficult to identify individual intermittently bonded ribbon and distinguish between the intermittently bonded ribbons. Especially, at the time of mid-span and installation of the high fibre density cable, identification of the intermittently bonded ribbons becomes difficult. Further, the intermittently bonded ribbons are distinguished from each other by printing different patterns on each intermittently bonded ribbon. However, for high fibre counts such as 6912 fibres in a single cable, printing patterns such as ring marking is required. Furthermore, as number of ring markings on each intermittently bonded ribbon gets increased, point stresses are induced on the optical fibres that results in micro-bending. Generally, tubes are used to hold optical fibre ribbons together and each tube has a unique color for identification. However, in the high fibre density cables, tubes cannot be used as utilization of tubes leads to increase in diameter of the high fibre density cables.

In light of the above stated discussion, there is a need for an efficient and effective optical fibre ribbon that overcomes the above stated disadvantages.

BRIEF SUMMARY OF THE INVENTION

In an aspect, the present disclosure provides an intermittently bonded optical fibre ribbon. The intermittently bonded optical fibre ribbon includes a plurality of optical fibres such that adjacent optical fibre of the plurality of optical fibres is bonded intermittently along the length by a plurality of bonds. The plurality of bonds is defined by a plurality of colours.

The plurality of bonds may form a predefined pattern. The predefined pattern may be used for identification of the intermittently bonded optical fibre ribbon.

The intermittently bonded optical fibre ribbon may have a first set of adjacent optical fibres and a second set of adjacent optical fibres. The first set of adjacent optical fibre may have a first plurality of bonds and the second set of adjacent optical fibre may have a second plurality of bonds. The first plurality of bonds may be of a first color and the second plurality of bonds may be of a second color.

Each of the plurality of bonds may have a length L of 4 millimetres to 20 millimetres.

The plurality of bonds has a distance D in between two consecutive bonds. The distance D may be in a range of 4 millimetres to 80 millimetres.

In another aspect, the present disclosure provides an optical fibre cable. The optical fibre cable includes a plurality of intermittently bonded optical fibre ribbons. The plurality of intermittently bonded optical fibre ribbons are bundled together to form a plurality of bundles. Each bundle is bundled using one or more coloured binders.

The one or more coloured binders may aid identification of a bundle from the plurality of bundles.

The plurality of intermittently bonded optical fibre ribbons may be bundled and placed in the optical fibre cable without being placed in one or more buffer tube.

Each bundle may be bundled using binders of two different colors.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which:

FIG. 3 illustrates a color identification pattern for a plurality of intermittently bonded ribbons;

Figure 1:
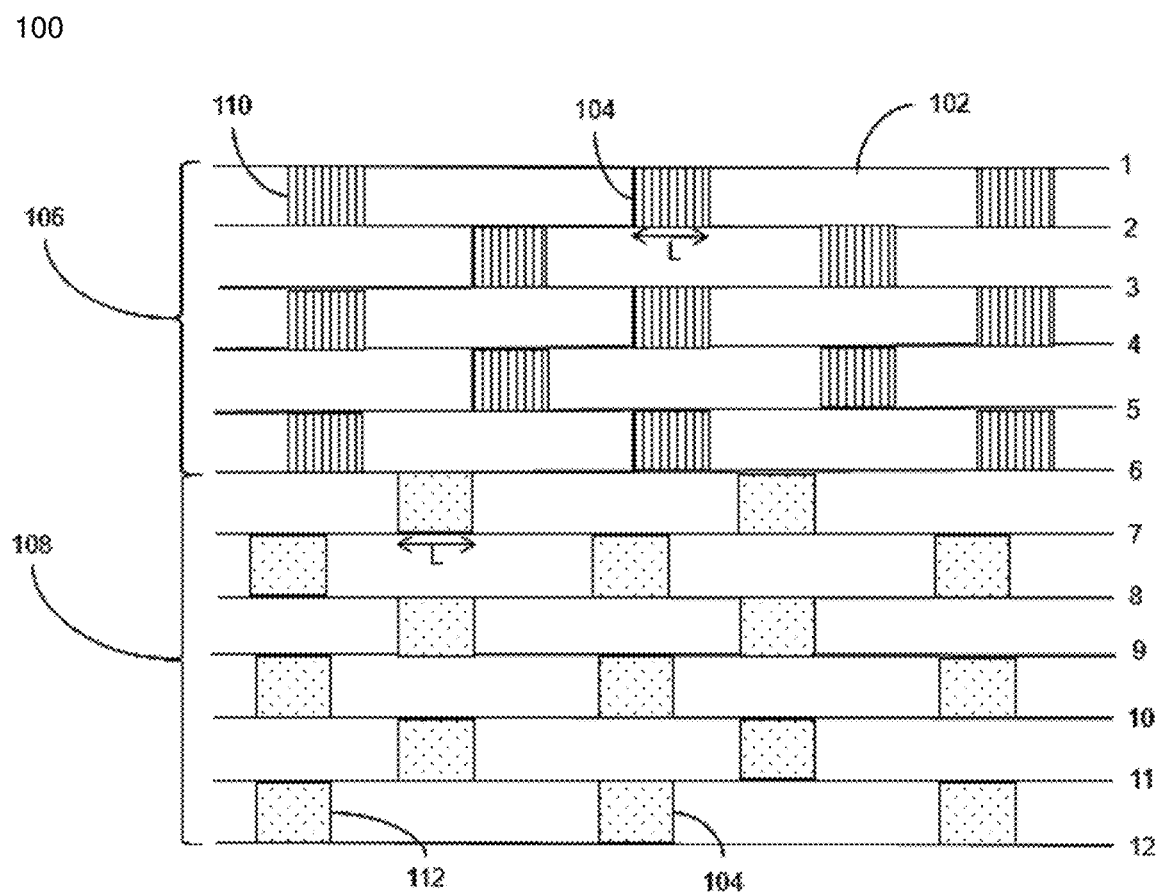
FIG. 1 illustrates a cross-sectional view of an intermittently bonded ribbon for color identification.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. The intermittently bonded optical fibre ribbon.
102. Plurality of optical fibres.
104. Plurality of bonds.
106. The first set of adjacent optical fibres.
108. The second set of adjacent optical fibres.
110. The first plurality of bonds.
112. The second plurality of bonds.
200. The intermittently bonded optical fibre ribbon.
202. Plurality of optical fibres.
204. Plurality of bonds.
206. The first set of adjacent optical fibre.
208. The second set of adjacent optical fibres.
210. The first plurality of bonds.
212. The second plurality of bonds.
300. Color identification scheme.
400. The optical fibre cable.
402. Plurality of bundles.
404. Water blocking tape.
406. Sheath.
408. Plurality of strength members.
410. Plurality of ripcords.
412. Plurality of water swellable yarns.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

According to FIG. 1, this is a cross-sectional view of an intermittently bonded optical fibre ribbon 100 for color identification. The intermittently bonded optical fibre ribbon 100 includes a plurality of optical fibres 102 and a plurality of bonds 104. In general, optical fibre ribbon includes number of optical fibres secured or embedded substantially parallel to one another within coating material. In general, optical fibre refers to medium associated with transmission of information over long distances in form of light pulses. In addition, optical fibre uses light to transmit voice and data communications over long distances. Further, optical fibre is a flexible, and transparent fibre made with silica or plastic slightly thicker than a human hair. The intermittently bonded optical fibre ribbon 100 may have high fibre density and low diameter. The intermittently bonded optical fibre ribbon 100 includes bonded and un-bonded portions between the plurality of optical fibres 102 in a longitudinal direction. The intermittently bonded optical fibre ribbon 100 includes the plurality of optical fibres 102 such that adjacent optical fibre of the plurality of optical fibres 102 is bonded intermittently along a length by the plurality of bonds 104. The plurality of bonds 104 is defined by a plurality of colours. The plurality of optical fibres 102 is bonded with the plurality of bonds 104. Each bond of the plurality of bonds 104 is a colored bond to enable identification of an optical fibre ribbon.

Each of the plurality of optical fibres 102 in the intermittently bonded optical fibre ribbon 100 may have a diameter in a range of about 160 micrometres to 250 micrometres. Each of the plurality of optical fibres 102 in the intermittently bonded optical fibre ribbon 100 may have a pitch in a range of about 160 micrometres to 250 micrometres. The diameter and the pitch of each of the plurality of optical fibres 102 in the intermittently bonded optical fibre ribbon 100 may vary. The plurality of bonds 104 may be made of a colored matrix material. In general, matrix material is used to bond optical fibres. Each of the plurality of bonds 104 may have rectangular shape. Each of the plurality of bonds 104 may have convex shape. Each of the plurality of bonds 104 may have concave shape. Each of the plurality of bonds 104 may have oval shape. Each of the plurality of bonds 104 may have any suitable shape of the like. The plurality of bonds 104 forms a predefined pattern. The predefined pattern may be used for identification of the intermittently bonded optical fibre ribbon 100.

The plurality of bonds 104 has a distance D in between two consecutive bonds. The distance D between two consecutive bonds of the plurality of bonds 104 may be same. The distance D between every two consecutive bonds of the plurality of bonds 104 may be different. The distance D may be in a range of 4 millimetres to 80 millimetres. The distance D may vary. Each of the plurality of bonds 104 of the intermittently bonded ribbon 100 may have equal length L. The plurality of bonds 104 may be placed in the intermittently bonded ribbon 100 in a specified pattern. The predefined pattern repeats periodically after a particular length of each of the plurality of optical fibres 102. Each of the plurality of bonds 104 may have a length L in a range of 4 millimetres to 20 millimetres. The length L of the plurality of bonds 104 may vary.

Number of the plurality of optical fibres in the intermittently bonded optical fibre ribbon is 8 or 12. Number of the plurality of optical fibres 102 in the intermittently bonded ribbon 100 may vary. Number of plurality of optical fibres 102 in the intermittently bonded optical fibre ribbon 100 is 12. The intermittently bonded optical fibre ribbon 100 may have a first set of adjacent optical fibres 106 and a second set of adjacent optical fibres 108. In an example, the first set of adjacent optical fibres 106 includes optical fibres 1-6 in a 12 fibre ribbon and the second set of adjacent optical fibres 108 includes optical fibres 6-12 in a 12 fibre ribbon (as shown in FIG. 1). The first set of adjacent optical fibre 106 may have a first plurality of bonds 110 and the second set of adjacent optical fibres 108 may have a second plurality of bonds 112. The first plurality of bonds 110 may be of a first color and the second plurality of bonds 112 may be of a second color. The first color may be different from the second color. The first color may be olive. The second color may be is blue. The first color of the first plurality of bonds 110 and the second color of the second plurality of bonds 112 between the plurality of optical fibres 102 may vary.

Figure 2:
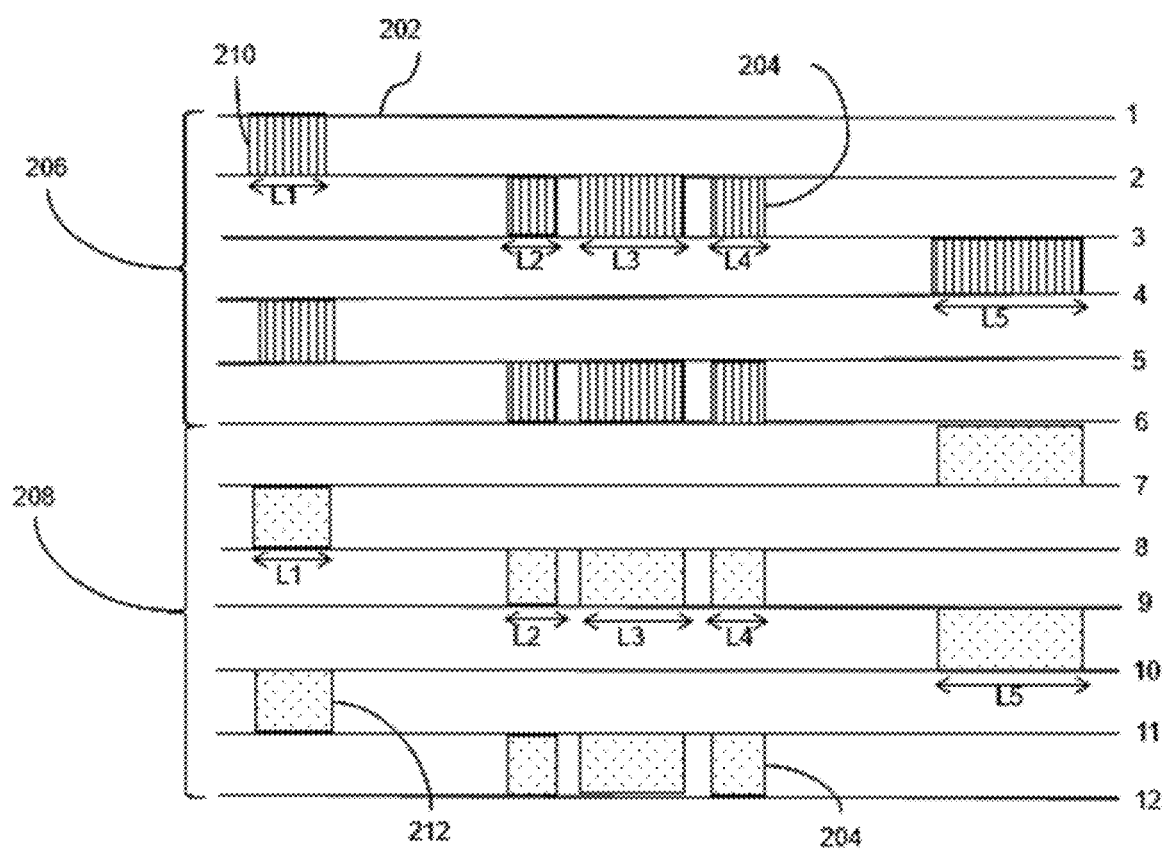
FIG. 2 illustrates the intermittently bonded ribbon of FIG. 1 for color identification.

According to FIG. 2, this is another intermittently bonded optical fibre ribbon 200 for color identification. The intermittently bonded optical fibre ribbon 200 includes a plurality of optical fibres 202 and a plurality of bonds 204. The intermittently bonded optical fibre ribbon 100 and the intermittently bonded optical fibre ribbon 200 may be similar but have different bonding patterns. The intermittently bonded optical fibre ribbon 200 includes the plurality of optical fibres 202 such that adjacent optical fibre of the plurality of optical fibres 202 is bonded intermittently along the length by the plurality of bonds 204. The plurality of bonds 204 is defined by a plurality of colours.

Number of plurality of optical fibres 202 in the intermittently bonded optical fibre ribbon 200 may be 12. Number of the plurality of optical fibres 202 in the intermittently bonded optical fibre ribbon 200 may vary. In addition, the plurality of bonds 204 between optical fibre 1 to optical fibre 6 of the plurality of optical fibres 202 is of blue color. Further, the plurality of bonds 204 between optical fibre 7 to optical fibre 12 is of olive color. Color of the plurality of bonds 104 between the plurality of optical fibres 202 may vary.

The intermittently bonded optical fibre ribbon 200 includes the plurality of bonds 204. Each of the plurality of bonds 204 may be made of the colored matrix material. Further, every two consecutive bonds of the plurality of bonds 204 may be separated by a distance. The distance between every two consecutive bonds of the plurality of bonds 204 may be different. The plurality of bonds 204 of the intermittently bonded optical fibre ribbon 200 may have variable lengths L1, L2, L3, L4 and L5. In addition, length of each of the plurality of bonds 204 of the intermittently bonded optical fibre ribbon 200 may be of any size. The plurality of bonds 204 may be placed in the intermittently bonded optical fibre ribbon 200 in the specified pattern. The specified pattern may repeats periodically after a particular length of each of the plurality of optical fibres 202. Each of the plurality of bonds 204 may have a length L in a range of 4 millimetres to 20 millimetres. The length L of the plurality of bonds 104 may vary. The plurality of bonds 204 may have a distance D in between two consecutive bonds. The distance D may be in a range of 4 millimetres to 80 millimetres. The intermittently bonded optical fibre ribbon 200 may have a first set of adjacent optical fibres 206 and a second set of adjacent optical fibres 208. In an example, the first set of adjacent optical fibres includes 206 optical fibres 1-6 in a 12 fibre ribbon and the second set of adjacent optical fibres 208 includes optical fibres 6-12 in a 12 fibre ribbon (as shown in FIG. 2). The first set of adjacent optical fibre 206 has a first plurality of bonds 210 and the second set of adjacent optical fibres 208 has a second plurality of bonds 112. The first plurality of bonds 210 may be of a first color and the second plurality of bonds 212 may be of a second color.

According to FIG. 3, this is a color identification scheme 300 of a plurality of intermittently bonded ribbons or binders. Each of the plurality of intermittently bonded ribbons is the intermittently bonded ribbon 100 or 200. The plurality of intermittently bonded ribbons include the plurality of optical fibres 102 bonded by the plurality of bonds 104. The plurality of bonds 104 in the plurality of intermittently bonded ribbons may be colored according to the color identification scheme 300. The coloring depends on the number of ribbons and corresponding number of fibres in the plurality of intermittently bonded ribbons.

Multiple intermittently bonded optical fibre ribbons may be bundled together to form a single bundle. The bundling may be done with the help of binders. There may be two or more than two binders to bind and form the single bundle. There may be multiple number of bundles placed in a cable. The binders may be colored according to the color identification scheme 300. One bundle may include group of 24 intermittently bonded ribbons 100. Number of the plurality of intermittently bonded ribbons 100 per bundle may vary. Number of the plurality of optical fibres 102 is 12. Number of the plurality of optical fibres 102 may vary.

The plurality of bonds 104 of each of the plurality of intermittently bonded optical fibre ribbons 100 is made of the colored matrix material. The colored matrix material may facilitate color identification of each of the plurality of intermittently bonded ribbons 100. The plurality of bonds 104 of the plurality of intermittently bonded optical fibre ribbons 100 may have different color. The plurality of bonds 104 of the plurality of intermittently bonded optical fibre ribbons 100 may have same color. In addition, different colors of the plurality of bonds 104 of the plurality of intermittently bonded optical fibre ribbons 100 may facilitate easy identification of each of the plurality of intermittently bonded ribbons 100.

Each of the plurality of intermittently bonded optical fibre ribbons 200 is bonded intermittently through the plurality of bonds 204. In an example, number of the plurality of intermittently bonded optical fibre ribbons 200 in a bundle is 24. In addition, for first 12 optical fibre ribbons, bonds between 1-6 optical fibres are of different color. Further, bonds between 7-12 optical fibres of all the 12 ribbons may be of same color. Other 12 optical fibre ribbons (13 to 24 optical fibre ribbons) may have the plurality of bonds 204 with single color but each of the individual intermittently bonded optical fibre ribbon includes different bond colors.

Further, multiple intermittently bonded optical fibre ribbons can be bundled together with one or more binders. The present disclosure provides a bundle of intermittently bonded optical fibre ribbons for use in an optical fibre cable. The bundle of intermittently bonded optical fibre ribbons includes a plurality of intermittently bonded optical fibre ribbons. Each of the plurality of intermittently bonded optical fibre ribbons corresponds to the intermittently bonded optical fibre ribbon 100 or 200 shown in FIG. 1 and FIG. 2. Each of the plurality of intermittently bonded optical fibre ribbons includes the bonded and the un-bonded portions between the plurality of optical fibres 102 in the longitudinal direction. Each of the plurality of intermittently bonded optical fibre ribbons are bundled together with the one or more binders. Each of the plurality of optical fibres 102 in each of the plurality of intermittently bonded optical fibre ribbons are bonded with the plurality of bonds 104. The plurality of bonds 104 in each of the plurality of intermittently bonded optical fibre ribbons may be colored with color matrix.

The bundle of intermittently bonded optical fibre ribbons may have 12 or 24 intermittently bonded optical fibre ribbons. The bundle of intermittently bonded optical fibre ribbons may have any number of intermittently bonded optical fibre ribbons.

The bundle of intermittently bonded optical fibre ribbons may have 12 intermittently bonded optical fibre ribbons. Each intermittently bonded optical fibre ribbon 100 in the bundle of intermittently bonded optical fibre ribbons includes the plurality of bonds 104. The plurality of bonds 104 between a first optical fibre to a sixth optical fibre may have first color for each intermittently bonded optical fibre ribbon 100 in the bundle of intermittently bonded optical fibre ribbons. The plurality of bonds 104 from a seventh optical fibre to a twelfth optical fibre may have second color for each intermittently bonded optical fibre ribbon 100 in the bundle of intermittently bonded optical fibre ribbons. The first color may be same for each intermittently bonded optical fibre ribbon 100 in the bundle of intermittently bonded optical fibre ribbons. The second color may be different for each intermittently bonded optical fibre ribbon 100 in the bundle of intermittently bonded optical fibre ribbons.

The bundle of intermittently bonded optical fibre ribbons may have 24 intermittently bonded optical fibre ribbons. Each intermittently bonded optical fibre ribbon 100 in the bundle of intermittently bonded optical fibre ribbons includes the plurality of bonds 104. A plurality of bonds between a first optical fibre to a sixth optical fibre may have first color and a plurality of bonds between a seventh optical fibre to a twelfth optical fibre may have second color for first 12 intermittently bonded optical fibre ribbons 100 of the 24 intermittently bonded optical fibre ribbons in the bundle of intermittently bonded optical fibre ribbons. The first color may be same for each intermittently bonded optical fibre ribbon 100 in the bundle of intermittently bonded optical fibre ribbons for the first 12 intermittently bonded optical fibre ribbons 100 of the 24 intermittently bonded optical fibre ribbons in the bundle of intermittently bonded optical fibre ribbons. The second color may be different for each intermittently bonded optical fibre ribbon 100 in the bundle of intermittently bonded optical fibre ribbons for the first 12 intermittently bonded optical fibre ribbons of the 24 intermittently bonded optical fibre ribbons in the bundle of intermittently bonded optical fibre ribbons. A plurality of bonds between a first optical fibre to a twelfth optical fibre may have same color for each of remaining 12 intermittently bonded optical fibre ribbons 100 of the 24 intermittently bonded optical fibre ribbons in the bundle of intermittently bonded optical fibre ribbons. For example, the bonds between optical fibre 1 and 2 and bonds between optical fibre 2 and 3 and so on till the $12^{th}$ fibre of $13^{th}$ intermittently bonded optical fibre ribbon of the ribbon bundle may have blue color (as shown in FIG. 3). A plurality of bonds for each of the remaining 12 intermittently bonded optical fibre ribbons of the 24 intermittently bonded optical fibre ribbons in the bundle of intermittently bonded optical fibre ribbons may be colored with a different color. For example, the bonds between optical fibre 1 and 2 and bonds between optical fibre 2 and 3 and so on till the $12^{th}$ fibre of $13^{th}$ intermittently bonded optical fibre ribbon of the ribbon bundle has blue color but the bonds between optical fibre 1 and 2 and bonds between optical fibre 2 and 3 and so on till the $12^{th}$ fibre of $14^{th}$ intermittently bonded optical fibre ribbon of the ribbon bundle has orange color (as shown in FIG. 3).

Each of the plurality of optical fibres 102 in the bundle of intermittently bonded optical fibre ribbons may have a diameter in a range of about 160 micrometres to 250 micrometres and a pitch in a range of about 160 micrometres to 250 micrometres. The diameter and the pitch of each of the plurality of optical fibres 102 in the bundle of intermittently bonded optical fibre ribbons may vary.

Figure 4:
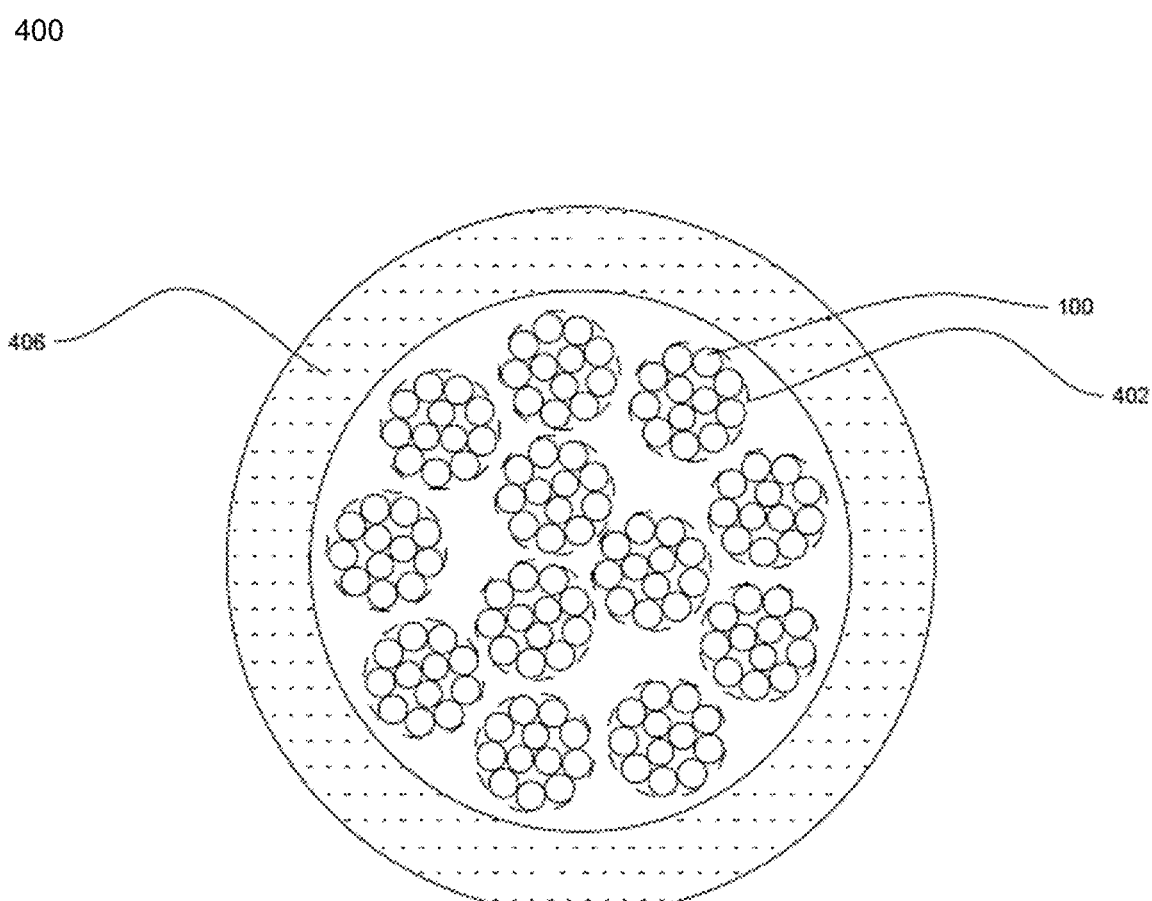
FIG. 4 illustrates an optical fibre cable.
Figure 5:
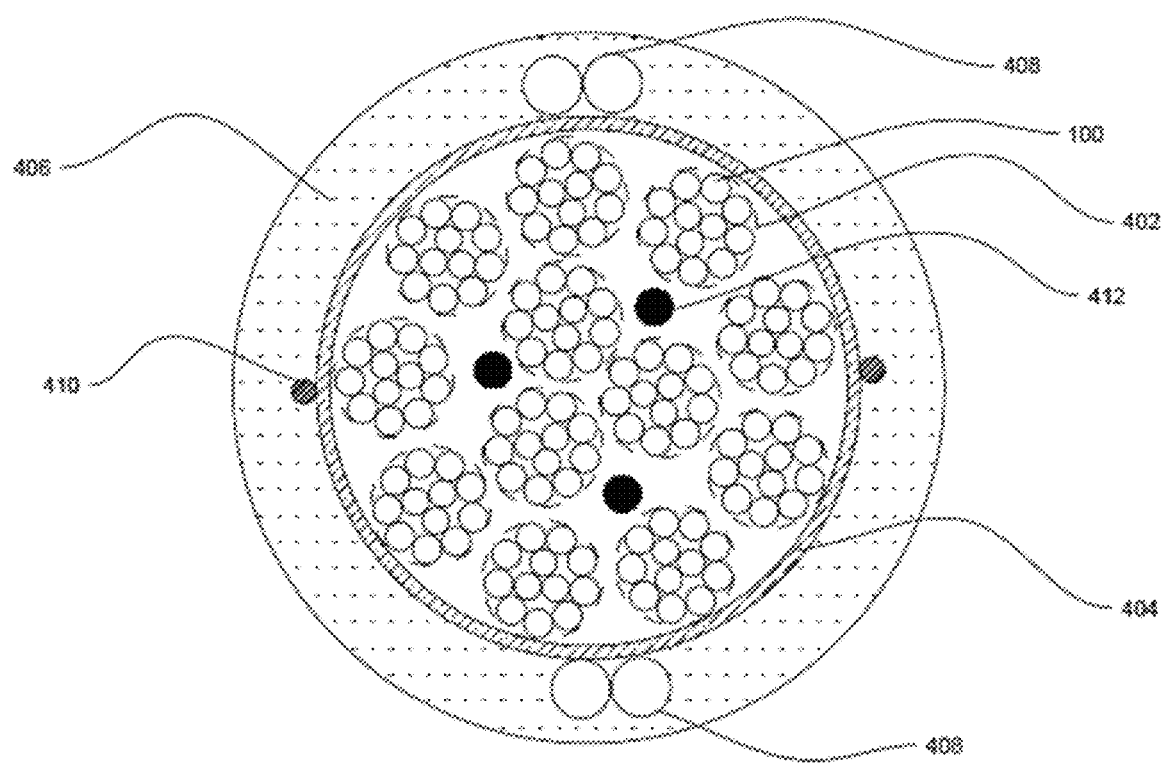
FIG. 5 illustrates another optical fibre cable.

According to FIG. 4 and FIG. 5, this is an optical fibre cable 400. The optical fibre cable 400 includes a plurality of intermittently bonded optical fibre ribbons 100, 200. Each of the plurality of intermittently bonded optical fibre ribbons corresponds to the intermittently bonded optical fibre ribbon 100, 200 of FIG. 1 and FIG. 2. The plurality of intermittently bonded optical fibre ribbons 100, 200 are bundled together to form a plurality of bundles 402. Each bundle is bundled using one or more coloured binders. The one or more coloured binders are used for identification of the plurality of intermittently bonded optical fibre ribbons bundles. The coloring of the one or more coloured binders may be done according to the color identification scheme 300 shown in FIG. 3. The plurality of intermittently bonded optical fibre ribbons 100, 200 may be bundled and placed in the optical fibre cable 400 without using buffer tube. The optical fibre cable 400 includes the plurality of bundles 402, and a sheath 406. In addition, the optical fibre cable 400 may include a water blocking tape 404, a plurality of strength members 408, a plurality of ripcords 410, and a plurality of water swellable yarns 412.

The one or more coloured binders may aid identification of a bundle from the plurality of bundles 402. The plurality of intermittently bonded optical fibre ribbons 100, 200 may be bundled and placed in the optical fibre cable 400 without being placed in one or more buffer tube. Each bundle may be bundled using binders of two different colors.

Each bundle of the plurality of bundles 402 includes the plurality of intermittently bonded ribbons 100, 200 bundled together using the one or more coloured binders. Each bundle of the plurality of bundles 402 includes the plurality of intermittently bonded ribbons 100, 200 bundled together using one or more dual end coloured binders. Number of the plurality of bundles 402 in the optical fibre cable 400 may be 12. Number of the plurality of bundles 402 in the optical fibre cable 400 may be 24. Number of the plurality of bundles 402 may vary. Number of the plurality of intermittently bonded ribbons 100, 200 in each bundle of the plurality of bundles 402 may be 12. Number of the plurality of intermittently bonded ribbons 100, 200 in each bundle of the plurality of bundles 402 may be 24. Number of the plurality of intermittently bonded ribbons 100, 200 of each bundle of the plurality of bundles 402 may vary. The plurality of intermittently bonded ribbons 100, 200 includes the plurality of optical fibres 102, 202. Number of the plurality of optical fibres 102, 202 in each of the plurality of intermittently bonded ribbons 100, 200 may be 12. Number of the plurality of optical fibres 102, 202 may vary. Number of the plurality of optical fibres 102, 202 inside the optical fibre cable 400 may be 1728 (corresponding to 12 bundles with each bundle containing 12 ribbons and each ribbon containing 12 optical fibres). Number of the plurality optical fibres 102, 202 inside the optical fibre cable 400 may be 6912 (corresponding to 24 bundles with each bundle containing 24 ribbons and each ribbon containing 12 optical fibres). Number of the plurality of optical fibres 102, 202 inside the optical fibre cable 400 may vary. Each bundle of the plurality of bundles 402 may include two different binders. Number of binders used to bundle the plurality of bundles 402 may vary. In addition, two binders have color pattern same as that of the intermittently bonded ribbon 100, 202 as shown in FIG. 3. In an example, number of the plurality of bundles is 24. In addition, two binders are used to bind each bundle of the plurality of bundles 402.

The one or more coloured binders for binding up to 12 bundles of the intermittently bonded optical fibre ribbons 100, 200 in the optical fibre cable 400 may include a first binder with first color and a second binder with second color. The first color of the first binder may be same for the each of the 12 bundles of the intermittently bonded optical fibre ribbons 100, 200. The second color of the second binder may be different for each of the 12 bundles of the intermittently bonded optical fibre ribbons 100, 200.

The one or more coloured binders for binding upto 24 bundles of the intermittently bonded optical fibre ribbons 100, 200 in the optical fibre cable 400 may include a first binder with first color and a second binder with second color for first 12 bundles of the intermittently bonded optical fibre ribbons 100, 200 of the 24 bundles of the intermittently bonded optical fibre ribbons 100, 200. The first color of the first binder may be same for each of the first 12 bundles of the intermittently bonded optical fibre ribbons 100, 200. The second color of the second binder is different for each of the first 12 bundles of the intermittently bonded optical fibre ribbons 100, 200. The one or more coloured binders for each of the remaining 12 bundles of the intermittently bonded optical fibre ribbons 100, 200 of the 24 bundles of the intermittently bonded optical fibre ribbons 100, 200 includes a first binder and a second binder. The first binder and the second binder for a bundle have same color. The first binder and the second binder for different bundles are of different color.

The optical fibre cable 400 may include the water blocking tape 404. The water blocking tape 404 may surround the plurality of bundles 402 (as shown in FIG. 5). In general, water blocking tape provides water resistance to optical fibre cables over long period of time. The water blocking tape 404 facilitates complete insulation and protects the optical fibre cable 400 against water ingression. Further, the optical fibre cable 400 includes the sheath 406. The sheath 406 is an outer most layer of the optical fibre cable 400. The sheath 406 provides protection to the optical fibre cable 400 from environmental conditions. The environmental conditions include but may not be limited to rainfall, snowfall, wind, and sunlight.

The optical fibre cable 400 may include the plurality of strength members 408. The plurality of strength members may be embedded inside the sheath 406 of the optical fibre cable 400. Each strength member of the plurality of strength members 408 may provide tensile strength to the plurality of bundles 402. Further, the optical fibre cable 400 may include the plurality of ripcords 410. In general, ripcords are used for stripping of sheath of optical fibre cable. The plurality of ripcords 410 may facilitate access to the plurality of optical fibres. The plurality of ripcords 410 may lie diametrically opposite to each other. Each of the plurality of ripcords 410 may have circular shape. The plurality of ripcords 410 may have any suitable shape. Number of the plurality of ripcords 410 inside the optical fibre cable 400 may be two. Number of the plurality of ripcords 410 inside the optical fibre cable 400 may vary.

The optical fibre cable 400 may include the plurality of water swellable yarns 412. The plurality of water swellable yarns 412 may be positioned along the plurality of bundles 402. The plurality of water swellable yarns 412 prevents ingression of water in the optical fibre cable 400. In addition, the plurality of water swellable yarns 412 is used to absorb moisture inside the optical fibre cable 400.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An intermittently bonded optical fibre ribbon comprising:
a plurality of optical fibres such that adjacent optical fibre of the plurality of optical fibres are bonded intermittently along the length by a plurality of bonds, wherein the plurality of bonds are defined by a plurality of colours, wherein each of the plurality of bonds is made of a single layer of colored material.

2. The intermittently bonded optical fibre ribbon as claimed in claim 1, wherein the plurality of bonds forms a predefined pattern, wherein the predefined pattern may be used for identification of the intermittently bonded optical fibre ribbon.

3. The intermittently bonded optical fibre ribbon as claimed in claim 1, wherein the intermittently bonded optical fibre ribbon has a first set of adjacent optical fibre and a second set of adjacent optical fibres, wherein the first set of adjacent optical fibre has a first plurality of bonds and the second set of adjacent optical fibre has a second plurality of bonds, wherein the first plurality of bonds are of a first color and the second plurality of bonds are of a second color.

4. The intermittently bonded optical fibre ribbon as claimed in claim 1, wherein each of the plurality of bonds has a length of 4 millimetres to 20 millimetres.

5. The intermittently bonded optical fibre ribbon as claimed in claim 1, wherein the plurality of bonds has a distance D in between two consecutive bonds, wherein the distance D is in a range of about 4 millimetre to 80 millimetres.

6. The intermittently bonded optical fibre ribbon as claimed in claim 1, wherein a plurality of intermittently bonded optical fibre ribbons are bundled together to form a plurality of bundles, wherein each bundle is bundled using one or more coloured binders for identification of a bundle from the plurality of bundles.

7. The intermittently bonded optical fibre ribbon as claimed in claim 1, wherein a plurality of intermittently bonded optical fibre ribbons are bundled together to form a plurality of bundles, wherein each bundle is bundled using one or more coloured binders for identification of a bundle from the plurality of bundles, wherein the one or more coloured binders aid identification of a bundle from the plurality of bundles.

8. The intermittently bonded optical fibre ribbon as claimed in claim 1, wherein a plurality of intermittently bonded optical fibre ribbons are bundled together to form a plurality of bundles, wherein each bundle is bundled using one or more coloured binders for identification of a bundle from the plurality of bundles, wherein the plurality of intermittently bonded optical fibre ribbons are bundled and placed in the optical fibre cable without being placed in one or more buffer tube.

9. The intermittently bonded optical fibre ribbon as claimed in claim 1, wherein a plurality of intermittently bonded optical fibre ribbons are bundled together to form a plurality of bundles, wherein each bundle is bundled using one or more coloured binders for identification of a bundle from the plurality of bundles, wherein each bundle is bundled using binders of two different colors.

10. An optical fibre cable comprising:
a plurality of intermittently bonded optical fibre ribbons, wherein the plurality of intermittently bonded optical fibre ribbons comprises a plurality of optical fibres such that adjacent optical fibre of the plurality of optical fibres are bonded intermittently along the length by a plurality of bonds, wherein each of the plurality of bonds is made of a single layer of colored material, wherein the plurality of intermittently bonded optical fibre ribbons are bundled together to form a plurality of bundles, wherein each bundle is bundled using one or more coloured binders for identification of a bundle from the plurality of bundles.

11. The optical fibre cable as claimed in claim 10, wherein the one or more coloured binders aid identification of a bundle from the plurality of bundles.

12. The optical fibre cable as claimed in claim 10, wherein the plurality of intermittently bonded optical fibre ribbons are bundled and placed in the optical fibre cable without being placed in one or more buffer tube.

13. The optical fibre cable as claimed in claim 10, wherein each bundle is bundled using binders of two different colors.

14. The optical fibre cable as claimed in claim 10, wherein the plurality of bonds are defined by a plurality of colours.

15. The optical fibre cable as claimed in claim 10, wherein each of the plurality of intermittently bonded optical fibre ribbons comprising a plurality of optical fibres such that adjacent optical fibre of the plurality of optical fibres are bonded intermittently along the length by a plurality of bonds, wherein the plurality of bonds are defined by a plurality of colours, wherein the plurality of bonds forms a predefined pattern, wherein the predefined pattern may be used for identification of the intermittently bonded optical fibre ribbon.

16. The optical fibre cable as claimed in claim 10, wherein the plurality of intermittently bonded optical fibre ribbons comprising a plurality of optical fibres such that adjacent optical fibre of the plurality of optical fibres are bonded intermittently along the length by a plurality of bonds, wherein the plurality of bonds are defined by a plurality of colours, wherein the plurality of intermittently bonded optical fibre ribbons has a first set of adjacent optical fibre and a second set of adjacent optical fibres, wherein the first set of adjacent optical fibre has a first plurality of bonds and the second set of adjacent optical fibre has a second plurality of bonds, wherein the first plurality of bonds are of a first color and the second plurality of bonds are of a second color.

17. The optical fibre cable as claimed in claim 10, wherein the plurality of intermittently bonded optical fibre ribbons comprising a plurality of optical fibres such that adjacent optical fibre of the plurality of optical fibres are bonded intermittently along the length by a plurality of bonds, wherein the plurality of bonds are defined by a plurality of colours, wherein each of the plurality of bonds has a length of 4 millimetres to 20 millimetres.

18. The optical fibre cable as claimed in claim 10, wherein the plurality of intermittently bonded optical fibre ribbons comprising a plurality of optical fibres such that adjacent optical fibre of the plurality of optical fibres are bonded intermittently along the length by a plurality of bonds, wherein the plurality of bonds are defined by a plurality of colours, wherein the plurality of bonds has a distance D in between two consecutive bonds, wherein the distance D is in a range of about 4 millimetre to 80 millimetres.

* * * * *